United States Patent [19]

Ast

[11] 4,188,675
[45] Feb. 19, 1980

[54] CONDUIT PLUG

[75] Inventor: Herbert H. Ast, Pacific Palisades, Calif.

[73] Assignee: Kaiser Aerospace & Electronics Corporation, Irvine, Calif.

[21] Appl. No.: 920,963

[22] Filed: Jun. 30, 1978

[51] Int. Cl.² ............................................. A47K 1/14
[52] U.S. Cl. ........................................ 4/295; 251/189; 277/116.6; 137/800; 138/89; 215/358; 220/237; 292/DIG. 65
[58] Field of Search ............... 251/149, 150, 189, 191; 277/36, 102, 116.6; 137/800; 138/89; 4/286, 295; 215/358; 220/233, 234, 237; 292/DIG. 65

[56] References Cited

U.S. PATENT DOCUMENTS

| 112,029 | 2/1871 | Gates | 4/295 X |
| 117,402 | 7/1871 | Gibson et al. | 4/295 |
| 772,434 | 10/1904 | Schultz | 4/295 X |
| 1,613,251 | 1/1927 | Stead | 4/295 |
| 2,023,560 | 12/1935 | Wayer | 251/189 |
| 2,273,480 | 2/1942 | Yates | 4/295 |
| 2,683,499 | 7/1954 | DeCroes | 4/295 X |
| 3,010,694 | 11/1961 | Lynch | 251/189 |
| 3,140,730 | 7/1964 | Costes | 138/89 |
| 3,155,116 | 11/1964 | VerNooy | 138/89 |
| 3,901,167 | 8/1975 | Reese | 138/89 X |
| 3,954,123 | 5/1976 | Duckworth | 137/800 |
| 4,027,701 | 6/1977 | Duckworth | 137/800 |
| 4,086,670 | 5/1978 | Krause et al. | 138/89 X |
| 4,088,149 | 5/1978 | Logsdon | 138/89 X |
| 4,100,629 | 7/1978 | Jones et al. | 4/295 |

FOREIGN PATENT DOCUMENTS

| 130217 | 11/1948 | Australia | 220/237 |
| 46157 | 1/1911 | Austria | 4/295 |
| 1014324 | 6/1952 | France | 220/237 |
| 118676 | 1/1927 | Switzerland | 4/295 |
| 743001 | 1/1956 | United Kingdom | 4/295 |
| 775309 | 5/1957 | United Kingdom | 220/237 |
| 1230723 | 5/1971 | United Kingdom | 251/191 |

Primary Examiner—Robert S. Ward, Jr.

[57] ABSTRACT

An improved lavatory drain plug includes a split hub structure, normally separated axially, upon which a cylindrical sealing member is mounted. Bringing the hub together exerts an outward radial force on the sealing member while the rim adjacent the hub exerts both radial and axial forces, resulting in a net outward movement of the member to sealingly engage the walls of a conduit into which the plug has been inserted.

17 Claims, 8 Drawing Figures

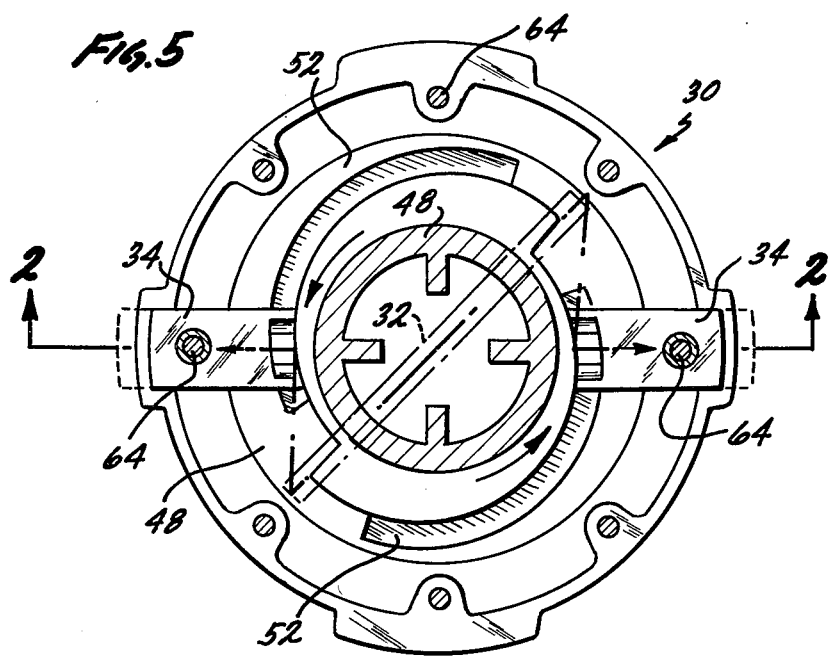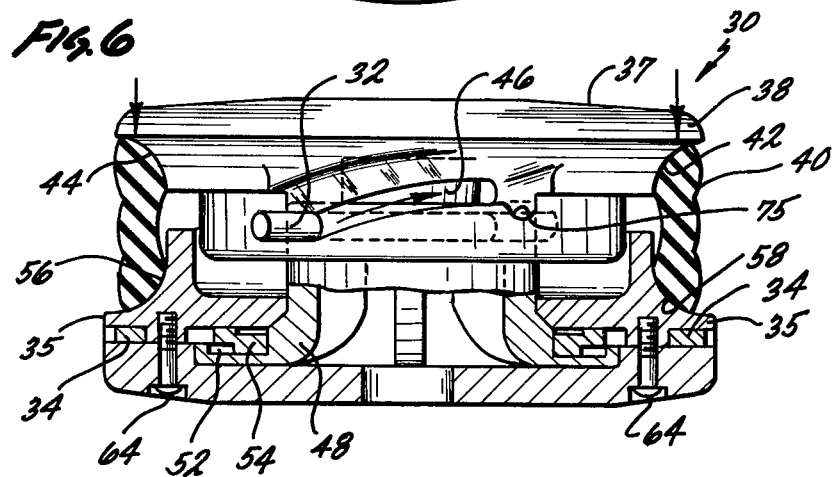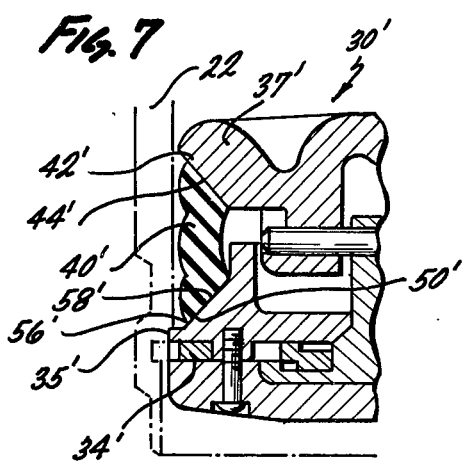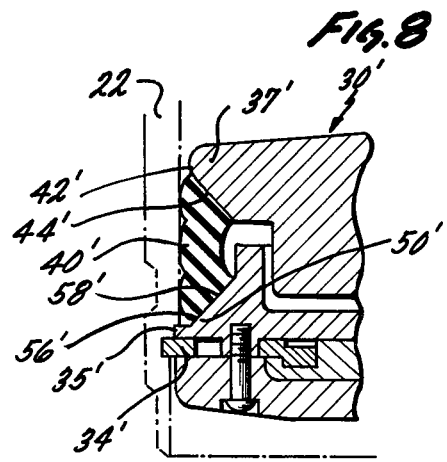

CONDUIT PLUG

BACKGROUND OF THE INVENTION

1. Field of the Invention

This invention relates to an apparatus for sealing conduits and more particularly, to an axially insertable, easily removable valve or plug which is operable to seal a conduit, thereby blocking fluid flow therefrom.

2. Description of the Prior Art

In the past, there have been applications in which it has been desirable to provide an insertable sealing member for a conduit, which is independent of any closure of the conduit. This is especially so in situations involving conduits having diameters of approximately 10 cm or greater where a cap or other closure device would tend to be large and bulky, especially if such conduits require quick sealing and/or removal to enable the conduit to be utilized.

A typical application for the present invention is in the drain conduit of an accumulating type tank, such as is found on aircraft. Typically, aircraft lavatory and toilet facilities drain into a large holding tank which must be periodically flushed and/or drained during the ground servicing of the aircraft. This requires that the conduit be quickly and easily opened and closed.

The assignee of the present invention has, through its predecessors in interest, manufactured and sold complete coupling assemblies adapted for temporary connection to such a tank or conduit outlet. Such coupling assemblies are used for quickly and efficiently draining the waste tank of an aircraft. A special plug was designed that could be remotely installed and removed in conjunction with the assembly.

That assembly and drain plug is disclosed in the U.S. Pat. to William B. Lynch, No. 3,010,694. A quick connect drain member is shown in FIGS. 1–4, inclusive and a conduit plug is disclosed and shown in FIGS. 5–8. The present invention is deemed a replacement of and substitute for the plug that was disclosed and claimed in that patent.

According to the Lynch patent, and as described in column 3, lines 21 et seq., a torus of elastomeric material, for example, a silicon rubber, is flattened and a second ring of a second material, such as sponge rubber separates the walls of the flattened torus.

A rigid material, such as steel, is used for the top and bottom cover plates. A cam mechanism is provided to extend and retract the cover plates in the axial direction to thereby compress the elastomeric sealing member. Applying a compressive force over substantially all of the area of the torus caused it to extrude in the radial direction, thereby sealing a conduit whose diameter closely approximated that of the plate members.

Because of the large volume of the elastic sealing member that had to be compressed, and because all of the operating cam mechanism, was located on the interior axis of the plug, the upper and lower plates had to be capable of transmitting substantially all of the compressive forces without deformation.

Further, from an examination of the plug structure, as disclosed in the Lynch patent, the plug required the assembly of many parts into a relatively complex structure that, among other things, did not permit easy replacement of the sealing member. The use of plastic materials enables mass production economies as well as a simplification of the assembly process.

It was therefore desirable to have a sealing plug of simpler and less costly construction and of lighter weight. Further, it was desirable to have the sealing member easily replaceable so that the same plug body might be utilized on conduits having different interior wall textures and with limited size variations.

SUMMARY OF THE INVENTION

According to the present invention, the concept of a radially expandable sealing member has been retained but the operating principles which mechanize this concept are substantially different. Further, the present invention seeks to avoid the penalty imposed by the use of a complex, metal structure, and rather, employs easily fabricated, non-metallic structural members throughout, except for locking arms, the cross pin which operates the mechanism and seating flanges, which are made of steel. A lighter structure of greater reliability creating a more effective seal results.

A sealing member of substantially cylindrical shape is mounted in what might be perceived as a wheel with a split hub, which enables axial movement of the opposing rim members. In the preferred embodiment, the rim includes a concave curved support surface which complements a convex curved seating surface on the cylindrical sealing member. The curved rim portion is then capable of exerting both axial and radial forces upon the sealing member.

The resultant material expansion of the outer cylindrical surface into sealing contact with the conduit in which it is placed, could then be a combination of extrusion, resulting from compression, and radial displacement, as the larger diameter support portion of the rim engages a greater portion of the cylindrical sealing member. Further, by reducing the "height" of the sealing member, the volume is preserved and the change in inner diameter does not result in a "thinner" cylinder.

An additional advantage of the sealing plug of the present invention, is the ease with which the sealing member can be replaced, if such is necessitated by wear and continued service.

In alternative embodiments, the shape and thickness of the sealing member can be varied to suit the application and the area of intended use. For example, in the preferred embodiment, the exterior or sealing surface includes a plurality of circumferential convexities or rings and an interior annular concavity in the central portion of the sealing member. This member is intended to fit on a plug which includes a rim having a complementarily curved support inner surface.

Alternatively, the exterior surface of the cylinder might have other surface features to facilitate insertion and withdrawal of the plug member and, depending upon the surface of the conduit to be sealed, may exhibit a substantially cylindrical outer surface. Further, the plug rim may employ a simple ramp shape on the support surface, so that as the upper and lower hub portions are brought together, the diameter supporting the sealing member is increased, while at the same time, the axial dimension available to the sealing member is reduced. This would result primarily in an outward radial displacement, creating the sealing engagement, with compression only incidentally aiding in forming the seal and for maintaining the thickness of the sealing member.

In the preferred embodiment of the drain plug according to the present invention, the plug includes a bottom cover (since the plug is generally inserted with the "bottom" adjacent the conduit opening), a top cover, a base plate, a cam member, a cross pin and a seal member. The bottom cover and cam member are apertured so as to afford access to the cross pin. An operating tool, substantially identical to those currently in use with the plugs of the prior art as exemplified in the Lynch patent, supra, engages the pin and, by rotating the pin, the cam member rotates, drawing the top and bottom covers into closer engagement.

Within the conduit, a circumferential shoulder is provided which prevents the plug from being inserted too deeply. The shoulder is crenellated with alternating merlons and crenels so that the plug may be seated and held against rotation. A matching crenellation is provided upon the periphery of the plug and a first pair of merlons are adjacent a pair of locking legs which seat in a groove in the conduit wall. A second pair of merlons, located at 90° from the first pair include a metal seating plate or dog which can resist the wear of rotation and seating, but to which the plastic would be susceptible.

The pair of locking legs include an operating flange which is engaged by a spiral channel in the cam member. Rotation of the cam member results in translational motion of the legs, which are adapted to engage the circumferential groove in the conduit, thereby supporting the plug against axial forces.

While the sealing member is intended to provide a fluid-tight seal, it is not intended to resist substantial forces in the axial direction. Accordingly, the locking legs are preferably made of steel.

In the preferred embodiment, the seal member includes three circumferential ring portions on the exterior or sealing surface. The inner surface of the sealing member includes an upper and lower convex curved edge portion joined by a concavity on the central inner perimeter.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is a view of the plug of FIG. 2 taken along the line 5—5 in the direction of the appended arrows and indicates the section line along which the view of FIG. 2 was developed;

FIG. 6 is a view of the plug of FIG. 2, only partly in section, showing the cam surface which is engaged by the cross pin;

FIG. 7 is a partial side section view of an alternative embodiment of the conduit plug of the present invention showing an alternative bearing surface for the sealing member; and FIG. 8 is a side section view of the embodiment of FIG. 7, shown in the closed or sealing configuration.

DESCRIPTION OF THE PREFERRED EMBODIMENT

Figure 1:
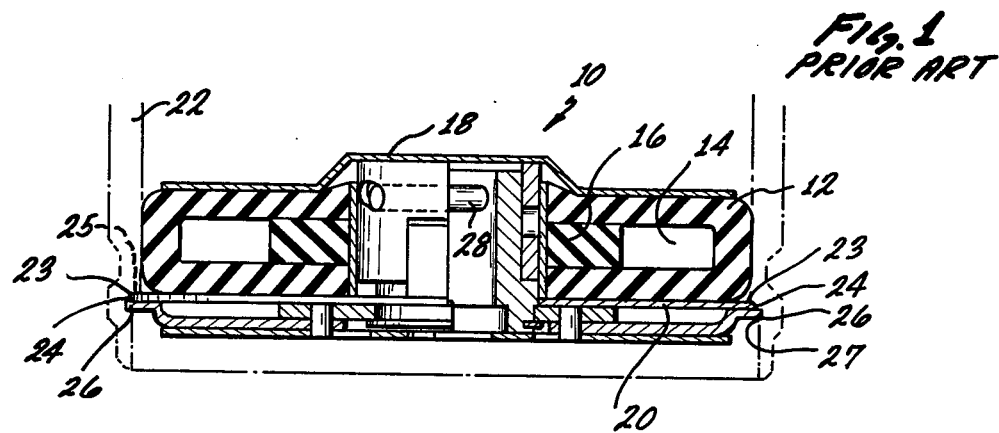
FIG. 1 is a side sectional view of a conduit plug according to the prior art.

Turning first to FIG. 1 there is shown, in side section, a conduit plug 10 of the prior art. FIG. 1 is substantially identical to FIG. 5 of the patent to Lynch, U.S. Pat. No. 3,010,694. The detailed description of that plug is set forth starting at Column 3, line 21 and continuing through Column 4, line 40.

Basically, the plug 10 includes a toroidal or donut-shaped ring with an interior annular space 14 that is partially filled with a soft deformable member 16. The toroidal ring 12 is held between an upper cover plate 18 and a lower cover plate 20.

In practice, the upper and lower plates 18, 20 have been made of steel to permit the uniform application of the forces of compression needed to extrude the toroid 12 outwardly into sealing engagement with the walls of a conduit 22. A pair of tabs 23 seat in a recess 24 or crenel of a crenellation 25, to hold the plug against rotation within the conduit 22. A pair of locking ears 26 engage an annular groove 27 in the conduit 22 to prevent axial movement of the plug 10 in the compressed or sealing configuration.

The plug 10 is operated by the use of a special tool which engages a cross pin 28. The pin engages appropriate cam surfaces so that rotation of the pin 28 results in axial translation of the upper and lower cover plates 18, 20, with respect to each other, thereby compressing the toroidal ring 12. The tabs 23 prevent the plug 10 itself from rotating within the conduit 22.

The present invention is intended to replace the conduit plug 10 of the prior art. Accordingly, the plug has substantially the same exterior dimensions and is adapted to fit within the same conduit 22 and locks into the same annular groove 27.

Figure 2:
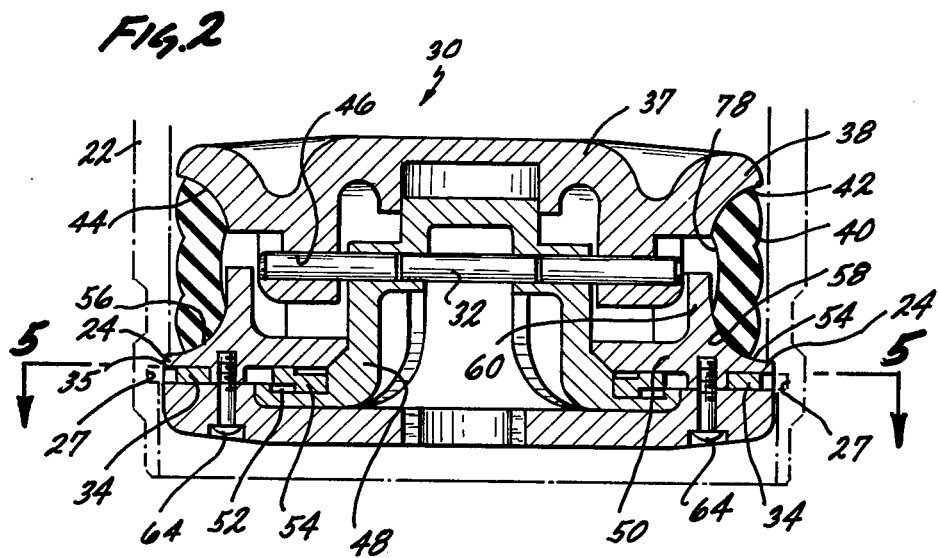
FIG. 2 is a side sectional view of a preferred embodiment of a conduit plug according to the present invention.

Turning then to FIG. 2, there is shown, in sectional view, a preferred embodiment of a conduit plug 30 according to the present invention. The section line along the view taken is shown in FIG. 5 as line 2—2.

Figure 3:
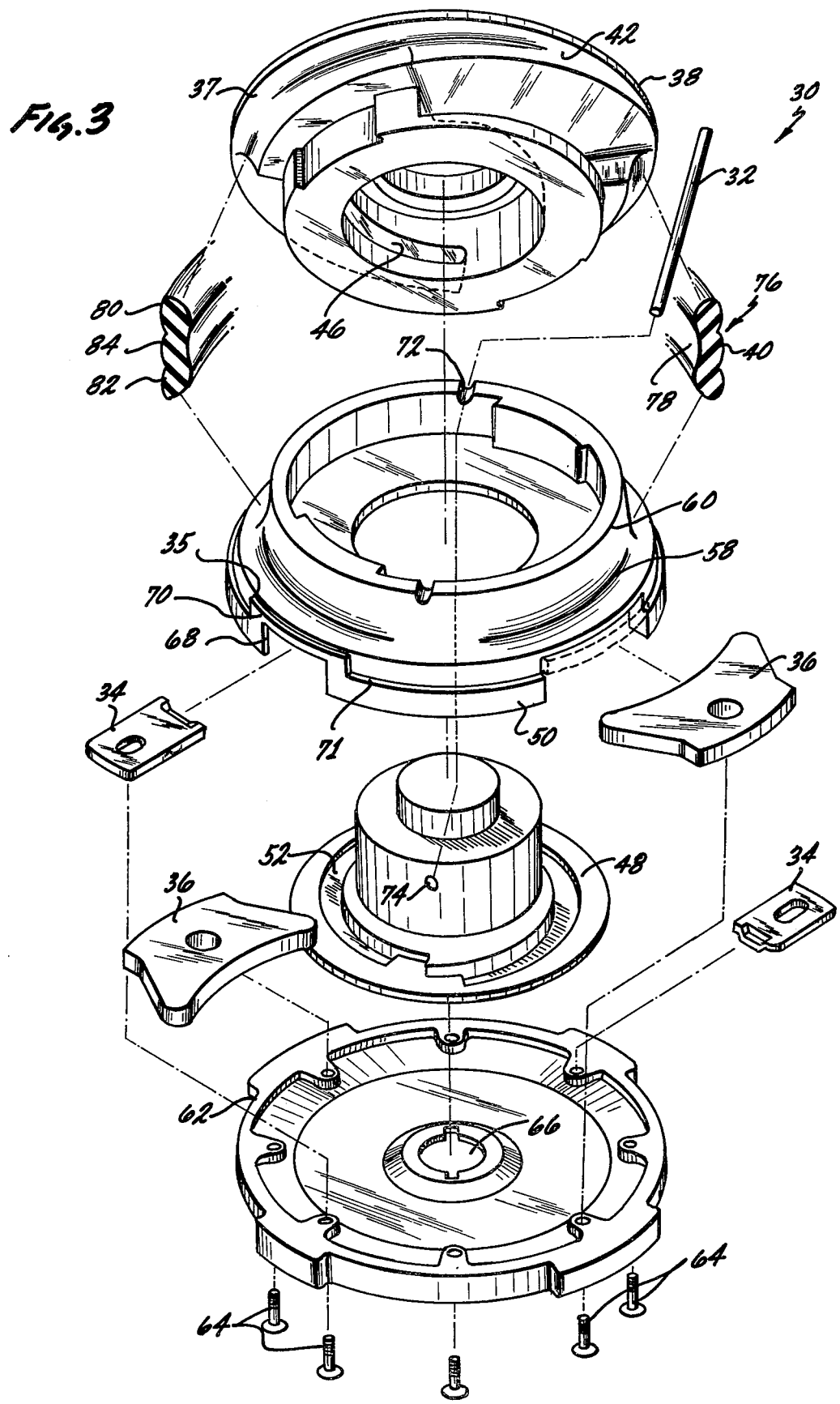
FIG. 3 is an exploded view of the plug of FIG. 2.

A plug 30 of the preferred embodiment is provided with a cross pin 32 whose function is substantially identical to that of the cross pin 28 of the prior art plug 10. In addition, a pair of extendable locking members 34 are adapted to engage the annular groove 27 of the conduit 22. The locking members 34 are made of a stainless steel to provide the necessary resistance to axial movement when the plug 30 is sealed in place. Adjacent the locking members are a pair of merlons 35 of a crenellated periphery which seat in the recess 24 or crenel of the crenellation 25. A pair of steel tabs 36, located 90° from the merlons 35 also fit in recesses 24, are best seen in FIG. 3.

The plug 30 includes a top cover member 37 which includes a supporting rim 38 to partially enclose a sealing member 40. In the preferred embodiment, the bearing surface 42 of the rim 38 is concave and matches a corresponding convex seating surface 44 of the sealing member 40.

The top cover member 37 includes a cam slot 46 against which the cross pin 32 bears. That slot 46 is displaced axially over an approximate 90° arc so that rotation of the pin 32 relative to the top cover member 37 translates the top cover member 37 in the axial direction.

The cross pin 32 is mounted in a cam operating member 48 which is concentrically mounted for rotation within a bottom cover member 50. The cam operating member 48 also includes a pair of spiral cam grooves 52 which engage flanges 54 on the locking legs 34. As the cam operating member 48 rotates, the locking legs 34 are translated in the radial direction. Any actuation of the cam operating member 48 to reduce the axial distance between the top and bottom cover members 37, 50, will, at the same time, extend the locking legs 34 to engage the annular groove 27 in the wall of the conduit 22.

The bottom cover member 50 also includes a rim portion 54 which includes a pair of slots through which the locking legs 34 may travel. The rim portion 54 includes a concave bearing surface 56 of substantially the same curvature as the top cover, concave bearing surface 42. Similarly, the sealing member 40 has an inner convex seating surface 58 which fits on the concave bearing surface 56.

The bottom cover member 50 also includes a hub section 60 as additional support for the cylindrical sealing member 40. In the preferred embodiment, the top cover member 37 is provided with only such vestigial hub portion as results from the concave bearing surface curvature continuing to a point of tangency with a coaxial cylinder, that includes the hub 60 of the bottom cover member 50.

A cover plate 62 is adapted to be fastened to the bottom cover member 50 with a plurality of screws 64. The cover plate 62 includes an aperture 66 through which an operating tool (not shown), such as is described in the Lynch patent, supra, may be inserted to engage the cross pin 32.

The exploded view of FIG. 3 permits a better understanding of the various members described in FIG. 2. As shown in FIG. 3, the device is assembled by inserting the locking legs 34 in their respective spiral cam grooves 52 of the cam operating 48. That combination is then placed into the bottom cover member 50, and the legs 34 will be located in the slots 68 provided for them. The merlons 35 are provided to engage the crenellation 25 within the conduit 22 that is adjacent the groove 27. A pair of steel tabs 36 also seat in the recesses 24 or crenels of crenellation 25 to hold the plug against wear. The steel tabs 36 can resist the wear that might otherwise occur if only plastic tabs were used in the recesses 24 of the metal conduit 22, thereby positioning the plug 20 so that when the locking legs 34 are extended, they will engage the groove 27.

The top cover member 37 is then placed on the bottom cover member 50 and aligned so that the cross pin 32 can be inserted through the cam slot 46, a pin slot 72 in the bottom cover member 50, and thence through an aperture 74 in the cam operating member 48, intended to receive the pin 32. The fit is a tight one so that the pin 32 will not disengage during operation and otherwise interfere with the operation of the plug 30.

With the pin 32 in place, the assembly is then locked into an integral hole. The sealing member 40 is then stretched over the rim 38 to ride in the recess provided for it. The cover plate 62 can then be attached with screws 64, and the unit is ready for use.

In operation, a slotted tool (not shown) is inserted through the operating aperature 66 and engages the cross pin 32. Rotating the cross pin 32 through approximately 90° causes the cam operating member 48 to rotate, extending the locking legs 34. At the same time, the ends of the pin 32 riding in the cam slot 46 of the top cover member 37, exerts an axial translational force on the top cover member 37, drawing it into closer engagement with the bottom cover member 50. As can be seen in FIG. 6, below, the cam slot 46, is provided at one end with a slight axial displacement or jog 75, so that, at the end of travel, the ends of the cross pin 32 are held in essentially a depression.

With the top and bottom cover members 37, 50 drawn towards each other, a simultaneous radial and axial force is applied to the cylindrical sealing member 40. The sealing member, as may be seen in FIG. 3, is provided, in the preferred embodiment, with a series of convex ribs 76 on the sealing surface and a concavity 78 on the interior surface.

Experiments have not yet fully determined how the sealing member 40 responds to the axial and radial forces when in a conduit 22, but it is believed that the sealing action takes place in one of three possible ways. The sealing member is shown with an upper, lower and central rib 80, 82 and 84.

In a first explanation, the upper and lower ribs 80, 82 are forced radially outwardly. The central rib 84 is displaced inwardly, tending to fill the area of the inner concavity 78. A second explanation is, as the axial forces are applied to the upper and lower ribs 80, 82, they fold inwardly about the concavity 78, forcing the central rib 84 outwardly into engagement with the conduit wall.

A third, and most probable explanation, is that the combination of axial and radial forces upon the sealing member 40 partly compresses and partly displaces the sealing member 40, essentially displacing all three ribs into a sealing engagement with the conduit wall.

Figure 4:
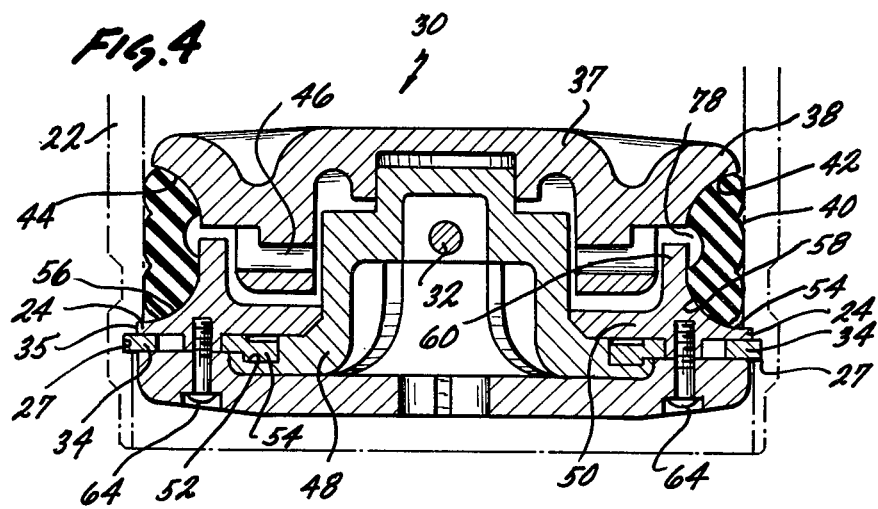
FIG. 4 is a side sectional view of the plug of FIG. 2 in the fully engaged position.

Turning next to FIG. 4, there is shown a side sectional view of the plug 30 of FIG. 2, substantially in its sealing configuration. As shown here, all three ribs are in engagement with the conduit wall 22 consistent with the third explanation. The locking legs 34 engage the annular groove 26, providing resistance to any axially directed forces that may be exerted on the plug 30. A merlon 35 is shown held in a recess 24 or crenel, thus accurately positioning the plug 20 while preventing rotation of the plug upon rotation of the slotted tool.

FIG. 5 is a top view of the plug of FIG. 2 taken along the line 5—5 in the direction of the appended arrows and shows the placement of the locking legs 34. The spiral cam grooves 52 receive the flange of the locking legs 34 and, as the cam operating member 48 rotates, the locking legs 34 translated.

In FIG. 6, there is shown in only part sectional view, the plug 30 of the present invention, more clearly showing the shape of the cam slot 46. The jog 75 in the slot 46 serves to lock the cross pin 32 when in the sealing configuration.

Turning finally to FIGS. 7 and 8, there is shown an alternative embodiment of a plug 30' according to the present invention. Here, similar elements have been given similar reference numerals but with a prime. The alternative plug 30' is provided with a substantially conical bearing surface 42' on the top cover member 37' and, similarly, a substantially conical bearing surface 56' on the bottom cover member 50'. A cylindrical sealing member 40' then has corresponding conical upper and lower seating surfaces 44', 58'.

In the sealing configuration, as illustrated in FIG. 8, it will be seen that the conical bearing surfaces 42', 56' provide a substantial outward radial force component on the cylindrical sealing member 40' as the effective diameter of the bearing surface increases. So that the thickness of the sealing member is not reduced, the opposing rims approach, shortening the effective height of the cylinder.

The forces on the sealing member are in this embodiment, to a great extent radial rather than compressional. However, to the extent that the volume occupied by the sealing member 40' is diminished, compression and extrusion may result, in addition to the radial displacement.

A sealing plug, according to the present invention, can be employed not only in circular conduits but in conduits of other shapes, as well. The only constraint would be that the shape of the plug portion substantially approximate and be similar to the shape of the conduit. Obviously, the sealing member can conform to the shape of both and since the result of an axial contraction of the rim and hub portions is a radial displacement of the sealing member, the present invention need not be limited to circular openings. Further, the present invention recognizes that one need not compress a large volume of an elastomer to achieve the desired radial extrusion but, rather, with sufficient axial displacement of the separated rim and hub members, a sealing member of suitable thickness will be deformed and/or displaced into a tight, sealing engagement with the wall of a surrounding conduit.

As has been shown in the preferred embodiment, an easily replaceable annular sealing member is mounted on an axially separated plug member. The plug member can be operated to contract on the axial direction. The surface against which the sealing member bears is arranged to have an increasing diameter from the center to the rim so that a contraction of the opposite sides of the plug apply a positive radial displacement to the sealing member. At the same time, the rim restrains the sealing member in the axial direction and re-directs any expansion or extrusion into the radial direction. Crenellations on the plug and in the conduit wall hold the plug against rotation. Since a smaller volume of elastomer is being operated upon, a lesser force is needed to bring the opposing halves together and therefore more easily fabricated plastic materials can be used in place of the rigid steel top and cover plate of the prior art.

The sealing plugs, according to the present invention, can be easily substituted in existing systems and can be operated with the tools currently in use. The change to the plugs of the present invention will provide a benefit, not only in plugs of simpler, less costly construction, but plugs in which the sealing element is easily replaced. The use of easily fabricated, nonmetallic members provides a design of less complexity and of approximately 20% lighter weight. Further, the reduction in complexity results in an increase in reliability. Finally, the novel coaxial assembly permits the combination to be secured by the insertion of the steel cross pin and an outer cap is provided to present a substantially smoother surface to the interior of the conduit, so that particulate matter is less likely to adhere to the plug or interfere with the seal.

Other modifications and improvements of the present invention will be apparent to those skilled in the art. Accordingly, the scope of the invention should be limited only by the claims appended hereto.

What is claimed as new is:

1. An axially insertable and removable conduit plug having a radially movable sealing member for forming a fluid-tight seal against axial flow in a conduit, comprising in combination:
    a first plug member having a perimeter similar in shape to the conduit, said plug member having a peripheral rim, a hub portion having a flange-like section for supporting a sealing member and a bearing surface with a decreasing diameter gradient from said rim;
    a second plug member having a perimeter similar in shape to said first plug member and having a peripheral rim and a bearing surface with a decreasing diameter gradient from said rim;
    connecting means for coaxially coupling said first and second plug members for relative axial motion to increase and decrease the axial separation therebetween; and
    an annular sealing member, elongated in the axial direction, to fit between said rims to said fully separated first and second plug members, said sealing member having an exterior sealing surface and an interior seating surface supportably mounted on said flange-like section of said hub portion; said sealing member being displaced radially outwardly as a result of said plug members decreasing their axial separation.

2. The conduit plug of claim 1 wherein said first and second plug members are circular in shape and said sealing member is made of an elastomeric material capable of deforming under compressive forces.

3. The conduit plug of claim 1 further including safety latch means including radially extensible leg members adapted to be deployed into engagement with the conduit, coupled to said connecting means and operable in response to decreasing axial separation of said plug members to deploy into engagement with the conduit.

4. The conduit of claim 1 wherein said bearing surfaces are curved to provide said diameter gradient.

5. The conduit plug of claim 1 wherein said bearing surfaces are conical to provide said diameter gradient.

6. The conduit plug of claim 1 wherein said annular sealing member has at least one annular concavity on said sealing surface.

7. The conduit plug of claim 1, or claim 4, wherein said annular sealing member has at least one annular convexity on said seating surface.

8. The conduit plug of claim 5 wherein said annular sealing member has three annular convexities on said sealing surface in the form of annular ribs to provide a fluid tight seal under deformation and radial displacement of said sealing member.

9. A conduit plug having a radially movable sealing member for forming a fluid-tight seal against axial flow in a conduit including:
    a first plug member having a rim portion;
    a second plug member having a rim portion opposing said first plug member;
    said rim portions including a seating surface extending in the axial direction with a decreasing diameter gradient, at least one of said rim portions terminating in a flange-like cylindrical section, for applying both axial compressional and radial displacement forces to said sealing member with decreasing axial separation of said plug members;
    connecting means for coupling said plug members for relative axial motion;
    operating means in said connecting means for translating said plug members in the axial direction to increase and decrease the axial separation thereof; and an annular, elastomeric sealing member, axially elongated to fit between said first and second plug member rim portions supported by said flange-like section when said plug members are fully separated, said sealing member deforming outwardly in the radial direction upon compression by said plug member rim portions and radial displacement by said seating surfaces when the axial separation of said plug members is decreased.

10. The conduit plug of claim 9 wherein at least one of said plug members has a hub portion adjacent said rim portion for supporting said sealing member and for preventing deformation of said sealing member toward the center during decreasing axial separation of said plug members.

11. The conduit plug of claim 9 wherein said rim portion seating surfaces are curved to provide said diameter gradient.

12. The conduit plug of claim 9 wherein said rim portion seating surfaces are conical to provide said diameter gradient.

13. The conduit plug of claim 9 wherein said annular sealing member has at least one annular concavity on said sealing surface.

14. The conduit plug of claim 9, wherein said annular sealing member has at least one annular convexity on said seating surface.

15. The conduit plug of claim 9 wherein said annular sealing member has three annular convexities on said sealing surface in the form of annular ribs to provide a fluid tight seal under deformation and radial displacement of said sealing member.

16. The conduit plug of claim 9 further including safety latch means including radially extensible leg members adapted to be deployed into engagement with the conduit, coupled to said connecting means and operable in response to decreasing axial separation of said plug members to deploy into engagement with the conduit.

17. The conduit plug of claim 9 further including locking means in said operating means for retaining said plug members at decreased axial separation to maintain said sealing member in a deformed, sealing condition.

* * * * *